April 13, 1954
H. M. KILPATRICK
2,674,751
BED ATTACHMENT FOR BEDCOVERS
Filed Oct. 4, 1947
6 Sheets-Sheet 1
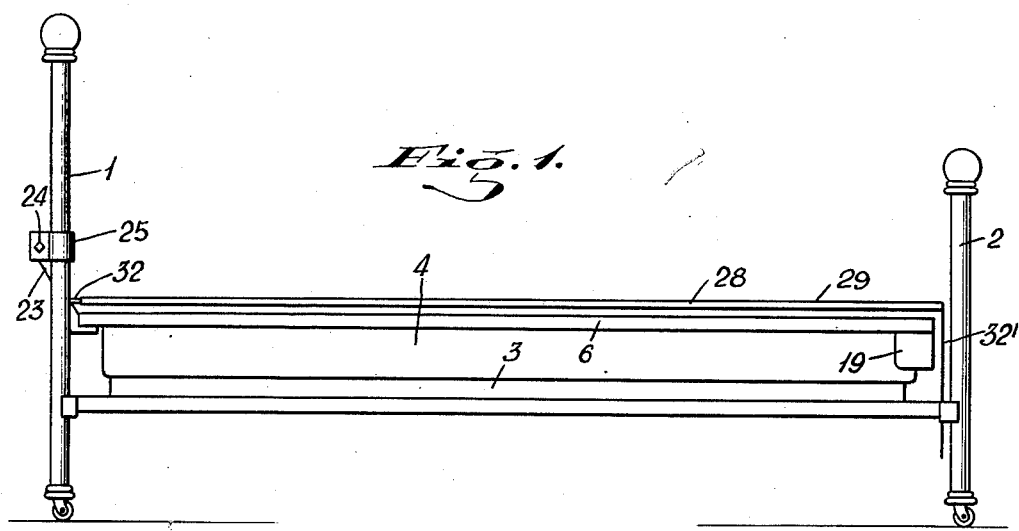
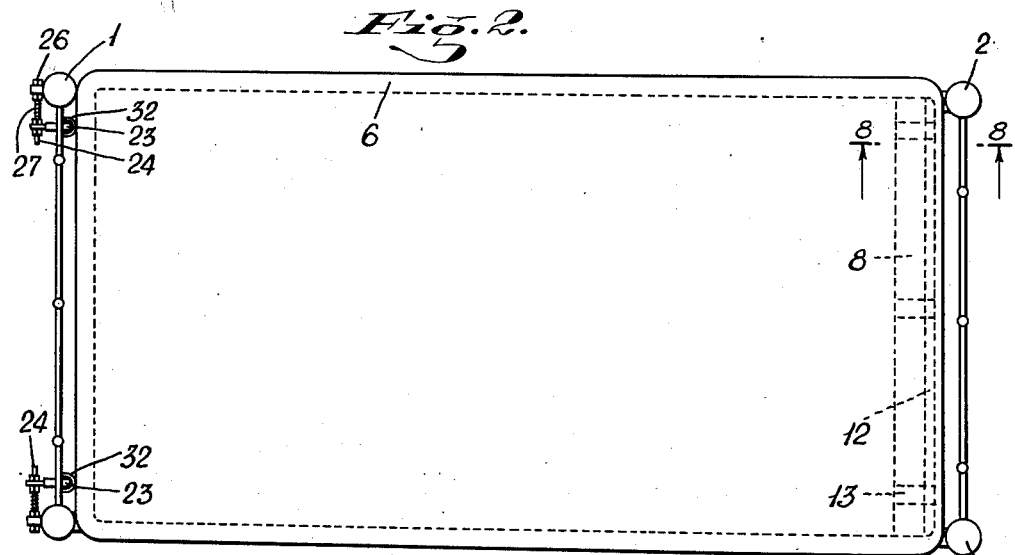
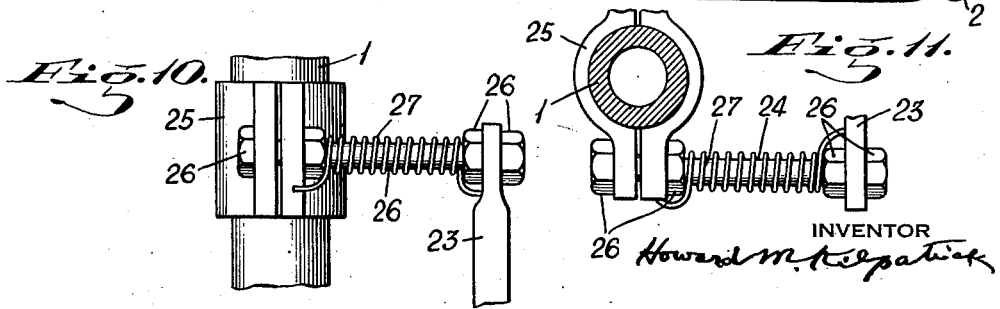
INVENTOR
Howard M. Kilpatrick April 13, 1954   H. M. KILPATRICK   2,674,751
BED ATTACHMENT FOR BEDCOVERS
Filed Oct. 4, 1947   6 Sheets-Sheet 2
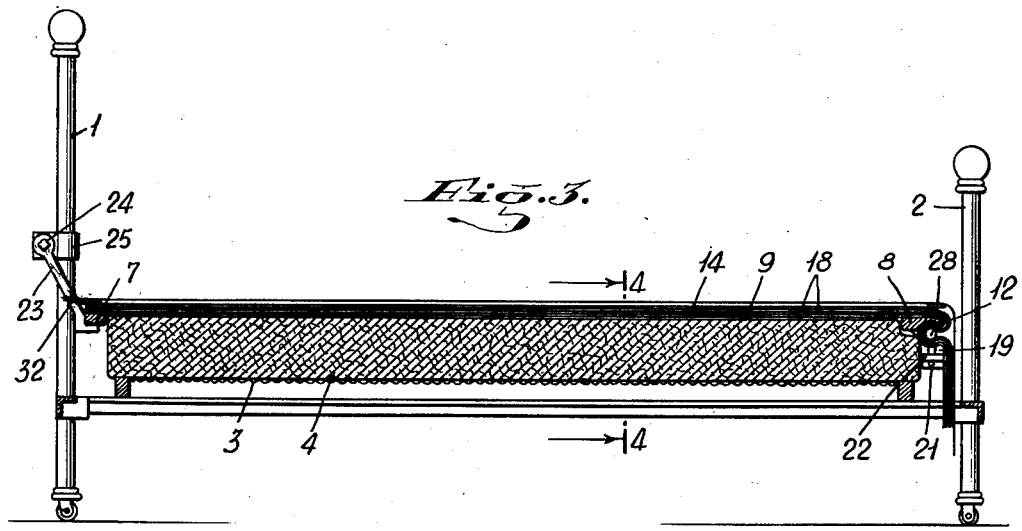
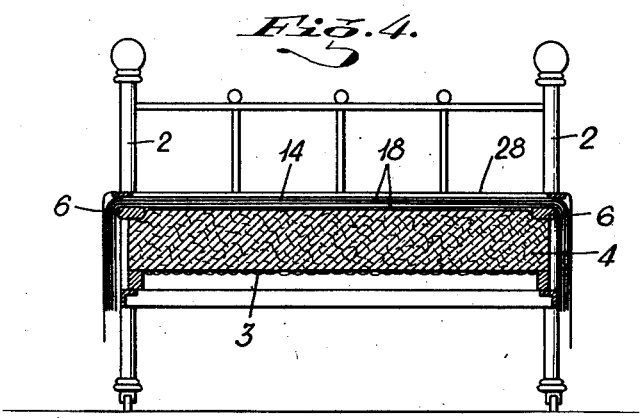
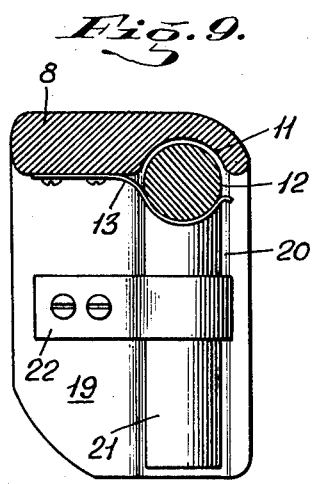
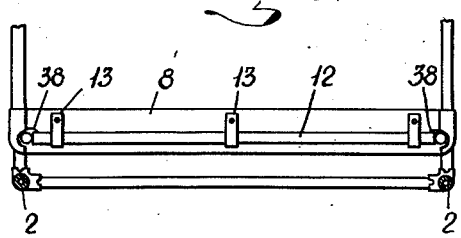
INVENTOR
Howard M. Kilpatrick April 13, 1954 H. M. KILPATRICK 2,674,751
BED ATTACHMENT FOR BEDCOVERS
Filed Oct. 4, 1947 6 Sheets-Sheet 3
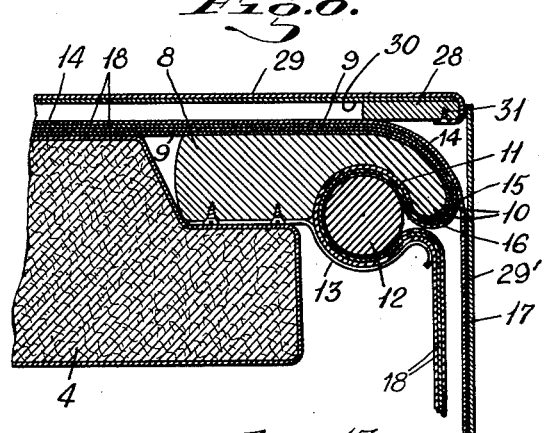
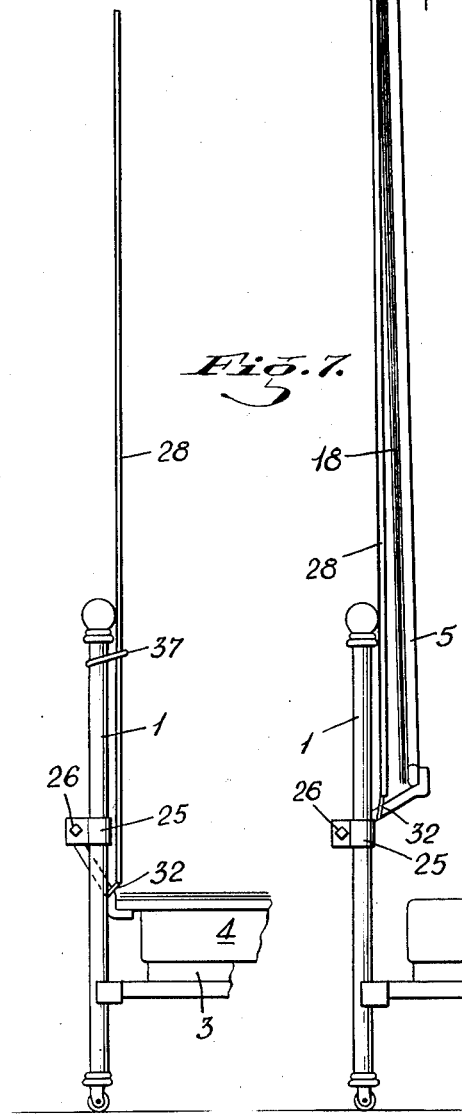
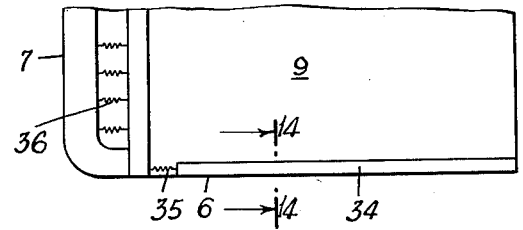
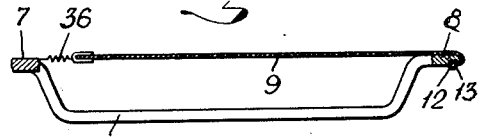
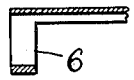
INVENTOR
Howard M. Kilpatrick

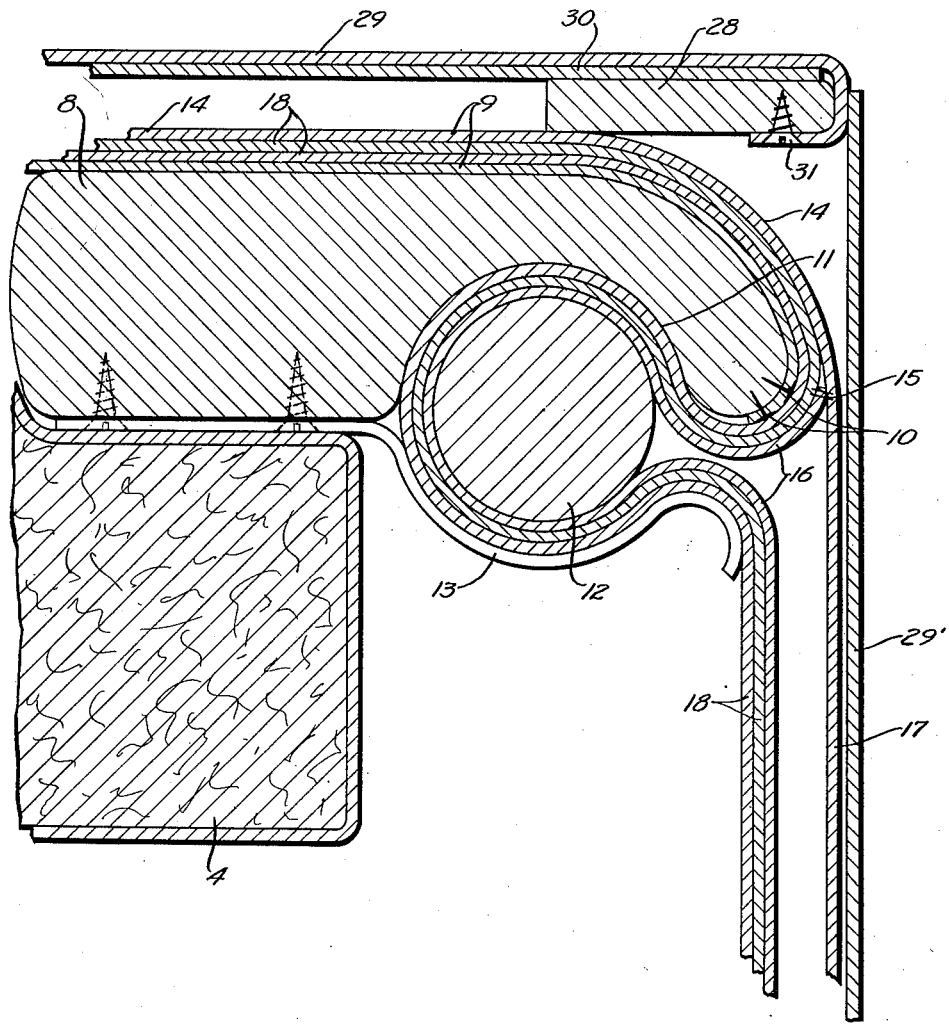

April 13, 1954    H. M. KILPATRICK    2,674,751
BED ATTACHMENT FOR BEDCOVERS
Filed Oct. 4, 1947    6 Sheets-Sheet 5
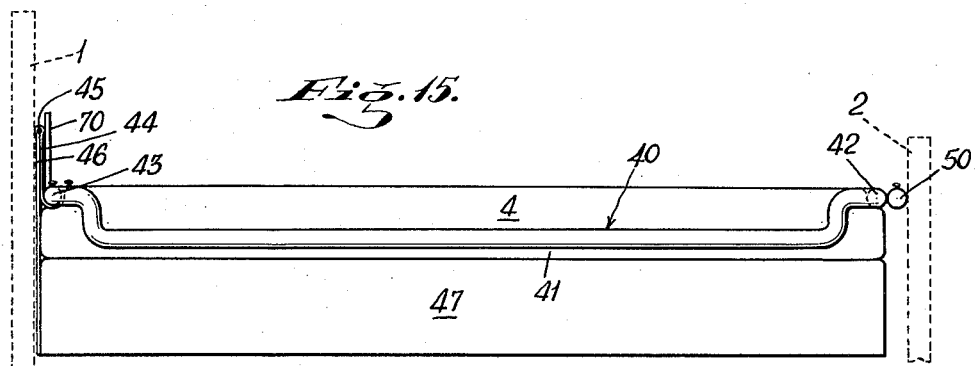
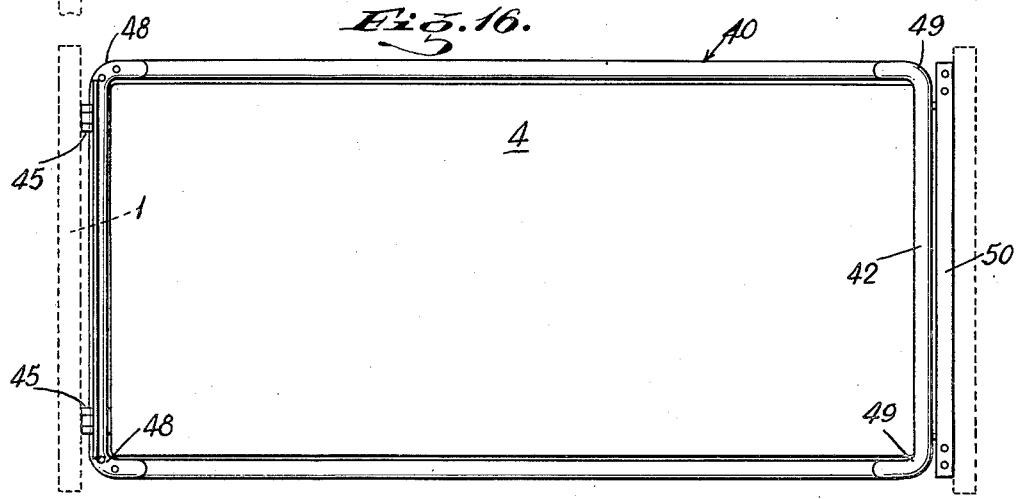
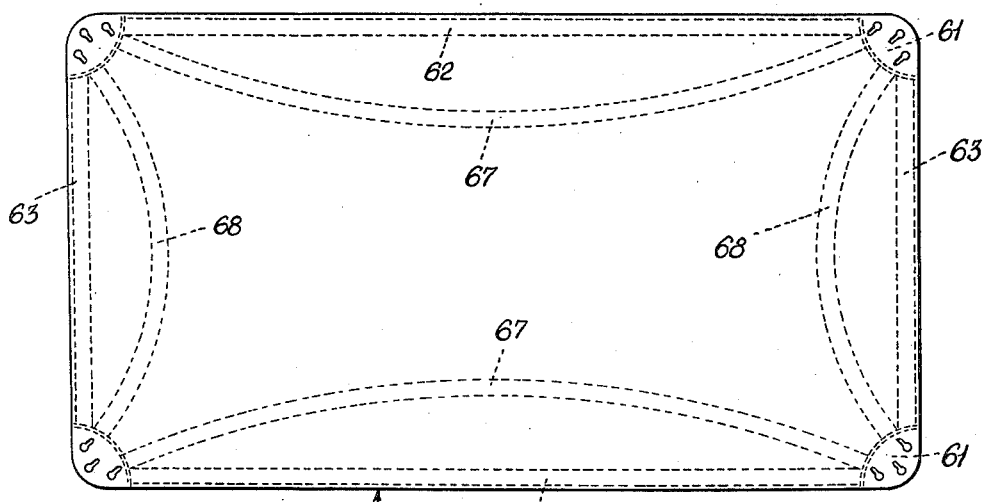
INVENTOR
Howard M. Kilpatrick

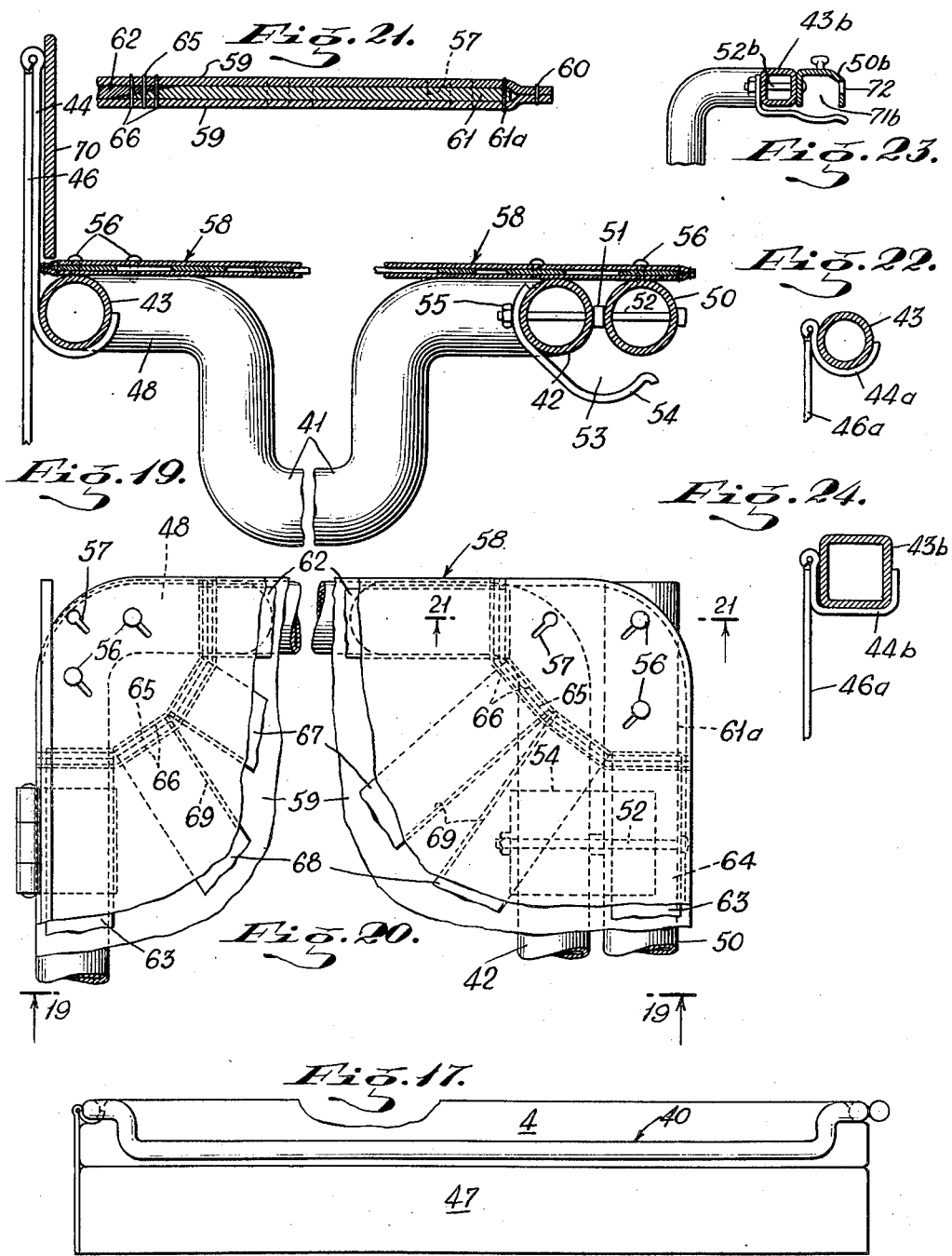

Patented Apr. 13, 1954

2,674,751

UNITED STATES PATENT OFFICE 2,674,751

BED ATTACHMENT FOR BED COVERS

Howard M. Kilpatrick, New York, N. Y.

Application October 4, 1947, Serial No. 777,976

29 Claims. (Cl. 5—321)

This invention relates to attachments for beds, and has for its object to provide a device for spreading the covers of or "making up" the bed almost instantly.

Another object is to provide an attachment whereby the covers may be entirely removed from the bed, suspended as long as desired, in curtain fashion, to air, and then spread upon the bed.

These objects are accomplished by providing a frame disposed around the mattress of the bed and hinged at the head of the bed and provided with a covering connecting the foot and head of the frame, and with means for securing bed covers to the foot of the frame. When the frame is moved to substantially vertical position, the bed covers will hang in curtain fashion, and when the frame is moved back to horizontal position, the bed will be made up.

In the accompanying drawings,

Fig. 1 is a side elevation of the device attached to a bed from which the covers are removed;

Fig. 2 is a plan of the device;

Fig. 3 is a longitudinal vertical sectional view showing the bed covers in position;

Fig. 4 is a sectional view taken on the line 4—4 of Fig. 3;

Fig. 5 is a bottom view of the lower frame of the device;

Fig. 6 is a side view showing the device in position for the bed to be slept upon;

Fig. 7 is a longitudinal vertical sectional view showing the device in vertical position;

Fig. 8 is an enlarged sectional view taken on the line 8—8 of Fig. 2 and showing the means for fastening the covers to the foot of the frame;

Fig. 8a is similar to Fig. 8 and drawn to a larger scale;

Fig. 9 is a similar view with the covers removed and showing an inside elevation of an extension leg on the lower frame;

Fig. 10 is a rear elevation of a lower frame hinge;

Fig. 11 is a top view of the same;

Fig. 12 is a longitudinal sectional view partly in elevation of a modified form of frame;

Fig. 13 is a fragmentary top plan view of the same;

Fig. 14 is a sectional view taken on the line 14—14 of Fig. 13;

Fig. 15 is a side elevation of a simple form of main or bottom frame made of iron piping and hinged to brackets supported by the frame of the bed spring;

Fig. 16 is a plan of the frame of Fig. 15;

Fig. 17 is a side elevation of a frame as in Fig. 15, with hinges which do not extend above the level of the frame;

Fig. 18 is a plan of the covering or cover sheet to be attached to the frame of Figs. 15 and 17;

Fig. 19 is an enlarged fragmental inside elevation, partly section, of the frame of Fig. 15, with the cover sheet of Fig. 18 thereon, the section being taken on the line 19—19 of Fig. 20;

Fig. 20 is a fragmental plan of the structure of Fig. 19;

Fig. 21 shows a further enlarged fragmental section taken on the line 21—21 of Fig. 20;

Fig. 22 is an enlarged fragmental sectional view showing, in side elevation, the hinge of Fig. 17;

Fig. 23 is a section similar to Fig. 22, showing a modified form of hinge secured to a main frame made of piping of approximately square cross-section; and Fig. 24 is a cross-sectional view through the foot piece of the frame of Fig. 23.

This invention is shown applied to a metal bedstead having head posts 1, foot posts 2 and a bed bottom or spring 3 supporting a mattress 4. Obviously other kinds of bedsteads or springs may be used.

The principal feature of the invention is the lower or main frame 5 composed of side pieces 6, a head piece 7 and a foot piece 8. The outer edges of said pieces 6 and 8 are rounded off somewhat at the upper outer edge and a piece of cloth 9 or the like is stretched or loosely spread across the top of said frame and fastened thereto in any convenient manner as by the tacks 10. This cloth should preferably be elastic in order that it may remain smoothly stretched and thus give a smooth appearance to the bed. The pieces 6, 7, and 8 lie substantially flush with the upper face of the mattress but project slightly beyond the mattress as shown in Figs. 3 and 4.

The covers are first spread on the bed in the usual manner, covering the cloth 9 entirely and hanging over the edges of the pieces 6, 7 and 8.

The covers are then fastened to the foot piece 8 in any convenient manner, preferably as follows:

A groove 11 (Figs. 5, 8 and 9) is provided running the length of the underside of the foot-piece 8, and a rod 12 is removably held in said groove by the flat springs 13. The covers are passed over the outer edge of the foot piece 8, and are held clamped in the groove 11 by the rod 12, the covers passing around the rod and between the rod and the piece 8 and between the rod and the springs 13.

In order that this arrangement may be hidden, the outer cover or counterpane 14 has sewed to the inner face thereof at 15 a strip of cloth 16. This strip extends the length of the groove 11 and is clamped therein, the free end 17 of the outer cover or counterpane hanging free as shown to hide the clamping means and the strip 16. The sheets 18, the strip 16 and the other covers, if any, pass around the rod 12 as shown.

Additional clamping space may be provided at the end of the foot piece 8 by the leg extension 19, which has at its inner face a groove 20, a short rod 21 and a flat spring 22 similar to the groove 11, rod 12 and spring 13 respectively. With the above described arrangement, it is almost impossible to pull the covers unfastened at the foot.

The head piece 7 is provided with a pair of hinge straps 23 pivotally received on bolts 24 held in place by clamps 25 on the head posts 1. The parts 23 and 24 are held in co-operative position by nuts 26; and a spring 27 acts against gravity when the frame is being raised.

The device as thus described is complete and operative, and is operated as follows:

After the covers are clamped to the foot piece 8 as hereinbefore described, the frame 5 is allowed to remain in horizontal position, and the bed is ready to be slept upon, it being found by experience that the side pieces 6 are not objectionable. After the bed has been slept upon, it is only necessary to raise the frame 5 to the position shown in Fig. 7, whereupon the covers will immediately fall, curtain fashion, and take the vertical position shown in said figure. The frame 5 is then carried back to horizontal position, and the covers will be found to have been thereby smoothly spread, the side pieces 6 forming a square edge to the mattress and giving to the bed a neat appearance. When the frame 5 is in the vertical position, the covers and the bed are in good condition for airing.

As stated above, the device as thus described is complete and fully operative, but if desired an additional or upper frame 28 is provided to carry an outer covering 29. The frame 28 has a canvas 30 tightly stretched across and fastened thereto, and the cover 29 is lightly spread thereover and fastened thereto or to the frame 28 in any convenient manner, as by tacking in several places, as at 31. A curtain or valance 29' hangs from said covering 29 and conceals the lower frame 5 and the covers thereon.

The head end of the frame 28 is provided with eye hinges 32 loosely receiving the hinge straps 23, whereby the frame 28 is permitted to take the position shown in Fig. 6, thus permitting the bed to be slept upon without soiling or wrinkling the covering 29. When the frame 5 is in vertical position, the straps are slanting as shown in Fig. 7, thus causing the frames 5 and 28 to separate at the bottom to give the covers between the frames space to fall to hanging position.

When the frame 28 and the covering 29 are used, the neat appearance of the covers thereunder is not so important, and the leg extension 19 may be omitted and the side frame 6 may be curved downwardly as shown in Figs. 12 to 14. When the piece 6 is thus curved, it is well to provide the cloth 9 with a strong binding 34 having therein a spiral spring 35 or other elastic medium to hold the edge taut. A series of springs 36 may be provided to hold the cloth 9 at a tension. These springs have their opposite ends fastened in any convenient manner to the head piece 7 and the adjacent end of the cloth respectively.

A loop 37 is fastened to the frame 28 and is looped over the head post 1 to hold the frame in vertical position when the bed is occupied. Cords or chains 38 may be used to keep the short rods 21 from getting lost from the rod 12.

The subject matter of Figs. 1 to 14 was transferred from my U. S. application, Serial No. 459,319, filed October 24, 1908, and allowed September 29, 1917; and the present application is, therefore, a substitute of the former insofar as it relates to Figs. 1 to 14.

Often it is desirable that the apparatus should be mounted upon the bedspring itself rather than upon the bedstead, so it may be used with such spring without regard to the construction of the bedstead. Such arrangements are shown in Figs. 15 to 24 herein, and were shown in Figs. 15 to 19 of my application Serial No. 326,516 filed September 26, 1919, which was a continuation in part of, and showed all the disclosure of, said application Serial No. 459,319; and in these figures the main frame is constructed of metal piping, to make it more durable and sanitary. All of the disclosures of said applications Serial Nos. 326,516 and 459,319 are shown herein, said applications being abandoned.

In Figs. 15 to 22 herein, the main frame 40 is constructed of a single endless metal pipe bent to form depressed side pieces 41, a foot piece 42 and a head piece 43. Welded to the head piece 43 near each end thereof is an upright strap hinge member 44 (Figs. 15 and 19) provided at the upper end with a hinge joint 45 pivotally supporting said member on the upper end of a bracket support 46 mounted on the end of a spring such as a box spring 47.

The main frame 40 of Figs. 15 to 22 has rounded corners 48, 49 in the horizontal plane of the head and foot pieces. A single straight pipe forming a supplemental foot piece 50, parallel to and slightly spaced from the foot piece 42, by washers 51 (Fig. 19), is held in position by horizontal bolts 52 (Fig. 19) passing through washers and both foot pieces.

The two foot pieces, together form a downwardly open groove 53 in which the clamping rod 12 may be held by springs 54 disposed around the foot piece 42 and held in position by nuts 55 on the bolts 52 passing through the springs.

In the top of the rounded corners 48 and the end portion of the straight pipe 50 are received the short stems of screws 56 whose heads provide buttons on which are received two of the three buttonholes 57 in each corner of a removable two-ply supporting cover or sheet 58 (Figs. 18 to 21) comprising upper and lower layers of cloth 59 (Fig. 21) joined at the edges 60 and having in each corner, between the layers, stiff reinforcements 61 of canvas, leather, perforated metal or the like, through which and the cloth said button holes 57 are provided. The reinforcements are held in place in the sheet by outer edge stitches 61a.

In the four side edges of the two-ply sheet, strong elastic edge ribbons 62, 63 are stretched, and secured to the layers by stitches 64 and have their ends secured on said reinforcements by stitches 65 passing through the ribbons and reinforcements, and stitches 66 passing through the reinforcements and said layers 59. Elastic tensioning ribbons 67, 68 disposed along and near the edge ribbons respectively and having their ends also secured to the reinforcements by said stitches 65, 66 are stretched and curved inwardly toward the center of the two-ply sheet and secured by stitches 69 throughout to said layers, to draw the intra-marginal parts of the two-ply sheet toward the edges thereof to tension and remove wrinkles from said intra-marginal parts and to remove inward stress from the edge ribbons to allow the latter to yieldably hold the edges of the two ply sheet substantially straight.

A thin, supplemental headboard 70 (Fig. 19) is secured to the hinge straps 44, serving to hide the hinges.

The apparatus of Figs. 15 and 17 to 21 operates as described of the apparatus of Figs. 1 to 14 without the parts 19 to 22 and 28 to 32, the rod 12 and springs holding the covers in the groove 53 formed by the two foot pieces 42 and 50.

The extended ends of the foot piece 50 render the respective adjacent corners less rounded than the corners 48 in order to prevent bed cover wrinkles at the margin of the two-ply sheet as the latter is lowered; and the stiff reinforcements 61 bridge the space between the rounded corners 48 and the piece 50.

The form and operation of invention of Fig. 17 is similar to that of the invention of Figs. 15 and 19 except that the hinge straps 44a, 46a are not extended above the level of the top of the mattress 4. This form is intended for use with beds having no headboard, or for use with beds having no headboard and no footboard but having the hinges at the foot of the bed. With this last arrangement, the bed may be slept upon with the head of the sleeper next to the hinges, but in the daytime the pillow covers next to the headboard could be used to hide the bed covers at the end of the rod 12, making the use of the strip 16 unnecessary.

The form and operation of the invention of Figs. 23 and 24 is similar to that of Figs. 15 to 22, except that the curved iron pipe and the pieces 42b, 43b are approximately square in cross section, the hinge strap 44b conformably receiving the piece 43b; and the groove 71b, receiving the rod 12 is formed of a single channel member 50b of approximately rectangular cross-section held in place flat against the foot piece 43b by bolts 52b whose heads engage the inner wall of said channel member. Openings 72 in the outer wall of the channel member allow easy insertion of the bolts.

I claim as my invention:

1. In combination, a bedstead having a stationary bed bottom; a mattress supported horizontally stationarily thereon; a stiff frame permanently the size of the top of the mattress hinged to one edge of said beadstead and movable relative to said bottom to upright position while the mattress is horizontal; a flexible cover on said frame and secured to the edge portions of the frame; and means for securing bed covers to the edge of the frame opposite to the hinged edge.

2. In combination, a mattress; a support therefor comprising uprights extending upwardly near adjacent upper corners of the mattress; a rectangular frame disposed over said mattress approximately at the edges thereof; offset hinges fixed to the part of said frame adjacent to the uprights and hinged to said uprights a distance above said mattress; a cover over said frame and secured to the edge portions thereof; and means for securing bed covers to the frame edge most remote from the hinges.

3. In a bed, a bed spring; a pair of upper and lower superposed frames disposed over the spring hinges connecting the frames to the bed each hinge comprising an upstanding strap secured to the lower frame and a part on the upper frame pivotally and slidably secured to the strap; said hinges permitting said frames to move angularly relative to said spring and each other, and permitting the upper frame to move by movement of translation toward and away from the frame most remote from the upper ends of the hinge straps.

4. In combination, a bed bottom; a foot piece disposed along the foot edge of the bottom and having a groove therein; attaching means comprising a rod yieldably held in said groove; an outer bed cover over said foot piece and hanging at the side and foot portions; and a strip of cloth secured to the inner face of said cover and disposed substantially entirely around said rod.

5. In combination, a bed bottom; a foot piece disposed along the foot edge of the bottom and having a groove therein; attaching means comprising a rod yieldably held in said groove; an outer bed cover over said foot piece and hanging at the side and foot portions; and a strip of cloth secured to the inner face of said cover remote from the foot edge thereof and disposed nearly entirely around the rod, said foot portion having the function of hiding all of said strip and all of the attaching means.

6. In combination, a bedstead having a stationary bed spring for supporting a mattress horizontally thereon; a frame hinged at the head of said bedstead and movable relative to said spring to horizontal or upright position; and means for securing bed covers across the foot of the frame.

7. In combination, a bedstead having a stationary spring; a mattress supported horizontally thereon; a rectangular frame the size of the mattress hinged to one edge of said bedstead and movable relative to said spring to upright position; means for securing bed covers to the edge of the frame opposite to the hinged edge; and yieldable means tending to raise the frame to upright position.

8. In combination, a bedstead having a stationary spring; a mattress supported horizontally thereon; a frame the size of the mattress, intra-marginally free of structure, hinged to one edge of said bedstead and movable relative to said spring to horizontal or upright position; and means for securing bed covers to the edge of the frame opposite to the hinged edge; said frame comprising a piece extending across the hinged edge adapted to have a cover secured thereto.

9. In combination, a bedstead having a stationary bed spring; a mattress supported horizontally thereon; a frame the size of the mattress; and hinge means hinging said frame at the head to the edge of said bedstead and movable relative to said spring to upright position and constraining said frame to be disposed offset from said edge when in said upright position; and means for securing bed covers to the edge of the frame opposite to the hinged edge.

10. In combination, a mattress; a spring thereunder; structures mounted on the spring and extending a short distance above the top level of the mattress at an edge of the mattress; a frame disposed over said mattress approximately the size thereof; offset hinges fixed to the edge of said frame adjacent to and hinged to said structures a distance above said mattress; and means for holding covers to the edge of the frame opposite to the hinged edge.

11. In a bed, a bed bottom; a pair of superposed frames thereon; and means at an edge of the bottom connecting the frames to the bed for pivotal movement to an upright position relative to said bottom, and for movement of the upper frame to a position away from the lower frame when the frames are upright.

12. In combination, a bed bottom; an elongated edge piece disposed along an edge of the bottom and having an elongated groove longitudinal to the piece in the underface thereof; and a rod yieldably held therein and removable therefrom and insertable therein by transverse movement of the rod.

13. In combination, a support; a mattress thereon; a cover on the mattress; and hidden means over the edge of the mattress secured to said support for detachably holding the cover on the mattress.

14. In combination, a mattress; an edge piece of inflexible material mounted adjacent to an edge of the mattress; a cover over said mattress and edge piece and having a portion hanging at the outer edge of said piece; and means for detachably securing said cover to said piece; said means being disposed under said piece and hidden by said portion.

15. In combination, a mattress; an edge piece disposed over an edge of the mattress and having a groove therein; a rod yieldably held in said groove; an outer bed cover over said edge piece and having a portion hanging at the outer edge of said piece; and a strip of cloth secured to the inner face of said cover and disposed substantially around said rod; said groove being in the underface of said piece a distance from said outer edge whereby results the function that said rod and strip are hidden by said portion.

16. In combination, a bed spring supporting a mattress in horizontal position; a frame disposed around the mattress and hinged to the spring at one edge of the mattress for movement relative to said spring and having at the opposite edge means to secure bed covers to the frame.

17. In combination, a bed spring supporting a mattress in horizontal position; a sheet disposed over the mattress; a sheet holder for holding said sheet along one edge of the mattress; a movable holder having a normal position at the opposite edge of the mattress for holding said sheet at said opposite edge; means for moving said movable holder to a position substantially above said sheet holder a distance substantially as great as the distance between said edges and restoring the movable holder to its normal position while substantially maintaining said distance.

18. In combination, a stationary horizontal mattress; a substantially rectangular frame comprising head and foot pieces horizontally disposable substantially from end to end of the head and foot edges of the top face of the mattress; a cloth smoothly spread across the frame and having its corners secured to the corners of the frame; stationary hinge structures mounted at the head of the mattress and extending as high as the level of the top face of the mattress at the edge of the mattress near the corners thereof; hinge members secured fast to said frame and hinged to said structures; and means to secure bed covers smoothly on said foot-piece substantially from end to end thereof.

19. In combination, a stationary horizontal bed spring; a mattress thereon; a frame comprising head, foot and side pieces horizontally disposable substantially at the edges of the mattress; a cloth smoothly spread across the frame and secured to the corners of the frame; stationary hinge structures mounted at the head of the spring and extending as high as the level of the top face of the mattress at the edge of the mattress near the corners thereof; hinge members secured fast to said frame and hinged to said structures; means to secure bed covers smoothly on said foot piece; whereby the frame may be quickly raised to substantially vertical position to allow the covers to hang in flat spread out curtain fashion above the hinge members, after which the frame may be quickly lowered to horizontal position, the covers lying flat against said cloth to prevent wrinkling when and after the frame is lowered.

20. In combination, a stationary horizontal bed spring; a mattress thereon; a frame comprising head, foot and side pieces horizontally disposable substantially at the edges of the mattress; a cloth smoothly spread across the frame and secured to the corners of the frame; stationary hinge structures mounted on the head of the spring and extending a short distance above the level of the top face of the mattress at the transverse edge of the mattress near the corners thereof; means to secure bed covers on the foot piece; hinge members secured fast to said head piece and having pivot parts upwardly offset above the head piece and frame when horizontal and hinged to said structures.

21. In combination, a stationary bed spring for supporting a horizontal mattress; a rectangular frame hinged at the head of the spring and comprising head and foot pieces horizontally disposable substantially at the head and foot of the top face of the mattress, the foot piece being wide and provided with a groove in its lower face longitudinal to the foot piece; a cloth smoothly spread across the top of the frame and secured at its edges to said pieces; a rod movably disposed in said groove throughout the length thereof, substantially around which rod, while in the groove, are smoothly passed the lower part of bed covers smoothly disposed on said frame and cloth; springs secured to the lower end of the foot piece exterior to the groove near the inner edge of the groove and pressing the rod and the covers around the rod in the groove to hold the rod and covers in the groove; an outer cover smoothly disposed over said bed covers and hanging over the edges of the frame to hide said rod and bed covers; and a strip of cloth disposed longitudinally of the rod and smoothly around the rod and having one side edge smoothly secured to the inner face of the outer cover to hold the outer cover on the frame, in position for the hanging part of the outer cover to hide the strip.

22. In combination, a stationary horizontal mattress; a rectangular main frame comprising head, foot and side pieces horizontally disposable at head, foot and side edges respectively of the mattress; a cloth smoothly secured across the top of the frame; means to secure bed covers to said foot piece; stationary hinge structures mounted at the head of the mattress near the corners thereof and having a pivot part disposed a short distance above the level of the mattress; hinge straps fast on said head piece and hinged to said pivot parts and extending at a downward and backward angle from the frame when vertical; an upper frame disposable over the main frame and having an outer cover secured smoothly thereover and a valance hanging from the sides thereof; eye-hinges fast on the head end of the upper frame and having eyes slidably and pivotally receiving the strap hinges; whereby the upper frame and outer cover may be quickly raised while the lower frame is horizontal and whereby when both frames are in vertical position the eye hinges may slide on the strap hinges and cause the lower part of the upper frame to be offset from the main frame to provide space above the hinge members for the covers to hang in flat spread out curtain fashion above the hinge members; whereupon the frame may be quickly lowered to horizontal position causing the outer cover and valance to hide the bed covers.

23. In a bed, a bed bottom; upper and lower frames superposed on the bottom; means pivoting a margin of the lower frame at an edge of the bottom; and means for pivotally and slidably connecting an edge of the upper frame to said margin.

24. In a bed, a bed bottom; a pair of superposed upper and lower frames thereon; means pivoting a margin of the lower frame at an edge of the bottom for movement to an upright position; and means pivotally connecting an edge of the upper frame to said margin and guiding said edge of the upper frame from said margin when the frames are upright.

25. In a bed, a bed bottom; a lower frame on said bottom; an upper frame superposed on the lower frame, and movable therefrom; means for pivoting a margin of the lower frame at an edge of the bottom for movement to upright position; and means for limiting movement of the upper frame from said margin.

26. In combination, upper and lower superposed frames; means for pivotally connecting a margin of the lower frame to a structure; and means for pivotally and slidably connecting the frames at said margin.

27. An attachment for making up beds comprising in combination, a frame having foot and side pieces horizontally disposable substantially near the foot and side edges of the mattress of a bed; means to secure bed covers to the foot piece; hinge members secured to said frame near the head corners; whereby when the frame is raised to substantially vertical position, the covers may hang in flat spread out curtain fashion.

28. An attachment for making up beds comprising, in combination, a frame having head, foot and side pieces horizontally disposable substantially at the edges of the mattress of a bed; a cloth disposed substantially smoothly across the frame and secured to the corners of the frame; means to secure bed covers to the foot piece; hinge members secured fast to said head piece and having pivot parts; whereby when the frame is raised to substantially vertical position, the covers may hang in flat spread out curtain fashion.

29. An attachment for making up beds comprising in combination, a frame having head, foot and side pieces horizontally disposable substantially at the edges of the mattress of a bed; a cloth disposed substantially smoothly across the frame and secured to the corners of the frame; means to secure bed covers to the foot piece; hinge members secured fast to said head piece and having pivot parts upwardly offset above the head piece and frame when horizontal, adapted to be hinged over the head edge of the mattress; whereby when the frame is raised to substantially vertical position, the head part of the frame is offset from the vertical plane of the pivot parts to provide space above the hinge members for the covers to hang in flat spread out curtain fashion above the hinge members.

References Cited in the file of this patent

UNITED STATES PATENTS

| Number | Name | Date |
|---|---|---|
| 795,122 | Henry | July 18, 1905 |
| 857,353 | Lawrence | June 18, 1907 |
| 957,240 | Naugle | May 10, 1910 |
| 959,763 | Lehr | May 31, 1910 |
| 975,335 | Dial | Nov. 8, 1910 |
| 984,070 | Brunelle | Feb. 14, 1911 |
| 1,608,924 | Brown | Nov. 30, 1926 |
| 1,668,373 | Krasity | May 1, 1928 |
| 1,687,580 | Melcer | Oct. 16, 1928 |
| 2,139,980 | Simon | Dec. 13, 1938 |
| 2,183,360 | Sussman | Dec. 12, 1939 |
| 2,284,448 | Reinholz | May 26, 1942 |